United States Patent
Peng et al.

(10) Patent No.: US 12,291,666 B2
(45) Date of Patent: *May 6, 2025

(54) HFO-1234ze, HFO-1225zc AND HFO-1234yf CONTAINING COMPOSITIONS AND PROCESSES FOR PRODUCING AND USING THE COMPOSITIONS

(71) Applicant: THE CHEMOURS COMPANY FC, LLC, Wilmington, DE (US)

(72) Inventors: Sheng Peng, Hockessin, DE (US); Mario Joseph Nappa, Leesburg, FL (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,491

(22) Filed: May 15, 2024

(65) Prior Publication Data

US 2024/0352296 A1    Oct. 24, 2024

Related U.S. Application Data

(63) Continuation of application No. 18/521,218, filed on Nov. 28, 2023, now Pat. No. 12,018,204, which is a continuation of application No. 18/210,527, filed on Jun. 15, 2023, now Pat. No. 11,866,634, which is a continuation of application No. 17/409,095, filed on Aug. 23, 2021, now Pat. No. 11,718,775, which is a continuation of application No. PCT/US2021/029166, filed on Apr. 26, 2021, and a continuation-in-part of application No. 17/193,021, filed on Mar. 5, 2021, now Pat. No. 11,209,196, which is a continuation-in-part of application No. PCT/US2020/029690, filed on Apr. 24, 2020, and a continuation-in-part of application No. 17/270,654, filed as application No. PCT/US2019/057999 on Oct. 25, 2019, now Pat. No. 11,702,379, said application No. PCT/US2020/029690 is a continuation-in-part of application No. PCT/US2019/057999, filed on Oct. 25, 2019.

(60) Provisional application No. 62/750,991, filed on Oct. 26, 2018.

(51) Int. Cl.
C09K 5/00     (2006.01)
C09K 5/04     (2006.01)

(52) U.S. Cl.
CPC .................................. C09K 5/045 (2013.01)

(58) Field of Classification Search
CPC ...................................................... C09K 5/045
See application file for complete search history.

(56) References Cited

U.S. PATENT DOCUMENTS

| | | | |
|---|---|---|---|
| 3,398,204 A | 8/1968 | Gallant | |
| 3,413,363 A | 11/1968 | Pindzola | |
| 5,986,151 A | 11/1999 | Van Der Puy | |
| 6,034,289 A | 3/2000 | Christoph et al. | |
| 6,124,510 A | 9/2000 | Elsheikh et al. | |
| 6,991,744 B2* | 1/2006 | Mahler | C10M 129/16 252/68 |
| 7,341,984 B2* | 3/2008 | Wilson | C08J 9/149 510/412 |
| 7,423,188 B2 | 9/2008 | Miller et al. | |
| 7,534,366 B2 | 5/2009 | Singh et al. | |
| 7,638,660 B2 | 12/2009 | Wang et al. | |
| 7,663,007 B2 | 2/2010 | Rao et al. | |
| 7,862,742 B2 | 1/2011 | Minor et al. | |
| 7,985,884 B2 | 7/2011 | Nappa et al. | |
| 8,444,874 B2 | 5/2013 | Singh et al. | |
| 8,822,739 B2 | 9/2014 | Nappa | |
| 8,883,708 B2* | 11/2014 | Singh | F25B 31/002 510/408 |
| 8,889,031 B2* | 11/2014 | Sawada | C10M 171/008 252/68 |
| 8,911,640 B2 | 12/2014 | Nappa et al. | |
| 8,926,856 B2 | 1/2015 | Low | |
| 9,157,017 B2* | 10/2015 | Singh | C11D 17/0043 |
| 9,302,962 B2 | 4/2016 | Peng et al. | |
| 9,512,343 B2 | 12/2016 | Rached et al. | |
| 9,556,372 B2 | 1/2017 | Kujak | |
| 9,598,621 B2 | 3/2017 | Minor | |
| 9,631,129 B2 | 4/2017 | Thomas et al. | |
| 9,708,537 B2 | 7/2017 | Singh et al. | |

(Continued)

FOREIGN PATENT DOCUMENTS

| | | |
|---|---|---|
| CN | 101479217 B | 7/2009 |
| CN | 101535228 B | 9/2009 |

(Continued)

OTHER PUBLICATIONS

Che et al., Experimental Study on Hydrate Cool Storage Medium of HFO-1234yf and HFO-1234ze Refrigerant Mixture, 2017, College of Energy and Power Engineering, University of Shanghai for Science and Technology, Shanghai, China (Abstract Only).

(Continued)

*Primary Examiner* — Filip Zec

(57) ABSTRACT

A fluoropropene composition comprising E-1,3,3,3-tetrafluoropropene, 1,1,3,3,3-pentafluoropropene, and 2,3,3,3-tetrafluoropropene, wherein the total amount of 1,1,3,3,3-pentafluoropropene and 2,3,3,3-tetrafluoropropene is 1.0 wt. % or less, based on the total weight of the fluoropropene composition. A method of producing the fluoropropene, composition and methods for using the fluoropropene composition are also disclosed.

23 Claims, No Drawings

(56) References Cited

U.S. PATENT DOCUMENTS

| | | | |
|---|---|---|---|
| 9,752,069 B2 | 9/2017 | Boussand | |
| 9,783,720 B2 | 10/2017 | Kontomaris | |
| 9,957,429 B2 | 5/2018 | Fukushima et al. | |
| 9,994,750 B2 | 6/2018 | Singh et al. | |
| 10,029,961 B2* | 7/2018 | Deur-Bert | C07C 19/08 |
| 10,029,963 B2 | 7/2018 | Bonnet et al. | |
| 10,035,938 B2 | 7/2018 | Rached | |
| 10,113,093 B2 | 10/2018 | Rached | |
| 10,119,056 B2 | 11/2018 | Rached et al. | |
| 10,125,296 B2 | 11/2018 | Rached | |
| 10,308,853 B2 | 6/2019 | Andre et al. | |
| 10,316,231 B2 | 6/2019 | Rached | |
| 10,343,963 B2* | 7/2019 | Bonnet | C07C 21/18 |
| 10,450,488 B2* | 10/2019 | Boussand | F25B 1/005 |
| 10,563,107 B2 | 2/2020 | Nappa et al. | |
| 10,688,329 B2 | 6/2020 | Nappa | |
| 10,858,564 B2 | 12/2020 | Rached | |
| 11,001,546 B2 | 5/2021 | Deur-Bert et al. | |
| 11,046,877 B1 | 6/2021 | Nappa et al. | |
| 11,130,893 B2 | 9/2021 | Rached | |
| 11,359,122 B2 | 6/2022 | Rached | |
| 11,370,948 B2 | 6/2022 | Rached | |
| 2004/0167366 A1 | 8/2004 | Rao et al. | |
| 2004/0256594 A1 | 12/2004 | Singh et al. | |
| 2005/0013764 A1 | 1/2005 | Merkel et al. | |
| 2006/0043330 A1* | 3/2006 | Wilson | C08J 9/146 252/67 |
| 2007/0108403 A1 | 5/2007 | Sievert et al. | |
| 2009/0099396 A1 | 4/2009 | Mukhopadhyay et al. | |
| 2009/0305876 A1 | 12/2009 | Singh et al. | |
| 2010/0044619 A1* | 2/2010 | Hulse | C09K 3/30 252/67 |
| 2010/0163781 A1* | 7/2010 | Sharratt | C09K 5/045 570/151 |
| 2011/0023507 A1* | 2/2011 | Yana Motta | C09K 5/045 62/115 |
| 2012/0043492 A1* | 2/2012 | Williams | C11D 7/5045 134/32 |
| 2012/0128964 A1 | 5/2012 | Hulse et al. | |
| 2012/0256120 A1* | 10/2012 | Bouvier | C09K 5/045 252/68 |
| 2013/0055739 A1 | 3/2013 | Rached | |
| 2013/0099154 A1 | 4/2013 | Boussand et al. | |
| 2013/0104575 A1* | 5/2013 | Kontomaris | F25B 30/00 252/68 |
| 2013/0160478 A1* | 6/2013 | Kontomaris | F25B 30/02 62/502 |
| 2013/0261353 A1 | 10/2013 | Pokrovski et al. | |
| 2014/0051896 A1 | 2/2014 | Imura et al. | |
| 2014/0191154 A1 | 7/2014 | Minor et al. | |
| 2015/0252281 A1 | 9/2015 | Saito et al. | |
| 2016/0009555 A1 | 1/2016 | Bonnet et al. | |
| 2016/0031773 A1 | 2/2016 | Bonnet et al. | |
| 2016/0046546 A1 | 2/2016 | Peng et al. | |
| 2016/0215133 A1 | 7/2016 | Bonnet | |
| 2017/0137682 A1* | 5/2017 | Hulse | C09K 5/045 |
| 2017/0210686 A1 | 7/2017 | Pigamo | |
| 2018/0355269 A1 | 12/2018 | Low et al. | |
| 2019/0047925 A1 | 2/2019 | Hong et al. | |
| 2021/0198547 A1 | 7/2021 | Ohkubo et al. | |
| 2021/0380858 A1 | 12/2021 | Peng et al. | |
| 2023/0340313 A1 | 10/2023 | Peng et al. | |
| 2024/0101884 A1 | 3/2024 | Peng et al. | |

FOREIGN PATENT DOCUMENTS

| | | |
|---|---|---|
| CN | 103319304 A | 9/2013 |
| CN | 104185616 A | 12/2014 |
| CN | 104710274 A | 6/2015 |
| CN | 104955917 A | 9/2015 |
| CN | 105050991 A | 11/2015 |
| CN | 104069878 B | 3/2016 |
| CN | 106349005 A | 1/2017 |
| CN | 107074696 | 8/2017 |
| CN | 104531079 B | 4/2018 |
| EP | 0486333 B1 | 12/1994 |
| EP | 3109302 B1 | 8/2020 |
| EP | 3130649 B1 | 11/2024 |
| JP | 2015515464 A | 5/2015 |
| JP | 2017527552 A1 | 9/2017 |
| JP | 2018526385 A | 9/2018 |
| WO | 2002077117 A2 | 10/2002 |
| WO | 2008/002500 A1 | 1/2008 |
| WO | 2008030443 A1 | 3/2008 |
| WO | 2010119265 A1 | 10/2010 |
| WO | 2011130237 A1 | 10/2011 |
| WO | 2013011291 A1 | 1/2013 |
| WO | 2013119919 A1 | 8/2013 |
| WO | 2013148300 A1 | 10/2013 |
| WO | 2014117014 A2 | 7/2014 |
| WO | 2016132111 A1 | 8/2016 |
| WO | 2017029499 A1 | 2/2017 |
| WO | 2017044719 A1 | 3/2017 |
| WO | 2020086928 A1 | 4/2020 |
| WO | 2021080645 A1 | 4/2021 |

OTHER PUBLICATIONS

Designation and Safety Classification of Refrigerants, ASHRAE Addenda, 2006 Supplement, ANSI/ASHRAE Addenda a, b, c, e, f, k, n, o, p, q, r, s and u to ANSI/ASHRAE Standard 34-2004, American Society of Heating, Refrigerating and Air-Conditioning Engineers, Inc., Atlanta, GA.

Designation and Safety Classification of Refrigerants, ASHRAE Standard, ANSI/ASHRAE Standard 34-2001 (Includes ANSI/ASHRAE Addenda listed in Appendix C), 2001, American Society of Heating, Refrigerating and Air-Conditioning Engineers, Inc., Atlanta, GA.

Designation and Safety Classification of Refrigerants, ASHRAE Standard, ANSI/ASHRAE Standard 34-2007 (Supersedes ANSI/ASHRAE Standard 34-2004), Includes ANSI/ASHRAE Addenda listed in Appendix F, 2007, American Society of Heating, Refrigerating and Air-Conditioning Engineers, Inc., Atlanta, GA.

International Search Report and Written Opinion for Application No. PCT/US2023/081363 mailed Mar. 20, 2024.

Lubricants in Refrigerant Systems, 1990 ASHRAE Handbook, Refrigeration Systems and Applications, Chapter 8, pp. 8.1 8.21, Atlanta, GA.

PCT International Search Report and Written Opinion for Application No. PCT/US2019/057999 mailed Jan. 21, 2020.

PCT International Search Report and Written Opinion for Application No. PCT/US2020/029690 mailed Jul. 9, 2020.

PCT International Search Report and Written Opinion for Application No. PCT/US2021/029166 mailed Jul. 12, 2021.

Saunders and Frisch, Polyurethanes Chemistry and Technology, 1962, pp. 193-201 and 219-223, vols. I and II, John Wiley and Sons, New York, NY.

Shubkin, Ronald L., Editor, Synthetic Lubricants and High Performance Functional Fluids, 1993, Chapter 2, Esters, pp. 43 65 and Chapter 4, Polyalkylene Glycols, pp. 101-123, Marcel Dekker, Inc., New York, NY.

Standard Test Method for Concentration Limits of Flammability of Chemicals (Vapors and Gases), ASTM E681-09, 2015.

* cited by examiner

HFO-1234ze, HFO-1225zc AND HFO-1234yf CONTAINING COMPOSITIONS AND PROCESSES FOR PRODUCING AND USING THE COMPOSITIONS

This Application is a continuation of U.S. application Ser. No. 18/521,218 filed on Nov. 28, 2023 which is a continuation of U.S. application Ser. No. 18/210,527 filed on Jun. 15, 2023 and issued as U.S. Pat. No. 11,866,634 on Jan. 9, 2024, which is a continuation of U.S. application Ser. No. 17/409,095 filed on Aug. 23, 2021 and issued as U.S. Pat. No. 11,718,775 on Aug. 8, 2023, which is a continuation of PCT Application No. PCT/US2021/029166 filed on Apr. 26, 2021 and a continuation-in-part of U.S. application Ser. No. 17/193,021 filed on Mar. 5, 2021 and issued as U.S. Pat. No. 11,209,196 on Dec. 28, 2021, which is a continuation of PCT Application No. PCT/US2020/029690 filed on Apr. 24, 2020 and is a continuation-in-part of U.S. application Ser. No. 17/270,654 filed on Feb. 23, 2021 and issued as U.S. Pat. No. 11,702,379 on Jul. 18, 2023, which is a 371 of international Application No. PCT/US2019/057999 filed on Oct. 25, 2019; and PCT/US2020/029690 is a continuation in part of PCT/US2019/057999 filed on Oct. 25, 2019 and claims benefit of provisional Application No. 62/750,991 filed on Oct. 26, 2018.

FIELD OF THE INVENTION

The present invention relates to tetrafluoropropene compositions and methods for making and using the compositions. The invention particularly concerns compositions comprising E-1,3,3,3-tetrafluoropropene (HFO-1234ze), 1,1,3,3,3-pentafluoropropene (HFO-1225zc), and 2,3,3,3-tetrafluoropropene (HFO-1234yf), and uses thereof as well as a method for producing a product comprising 1,3,3,3-tetrafluoropropene (HFO-1234ze), 1,1,3,3,3-pentafluoropropene (HFO-1225zc), and 2,3,3,3-tetrafluoropropene (HFO-1234yf) from 1,1,1,3,3-pentafluoropropane (HFC-245fa).

BACKGROUND OF THE INVENTION

The fluorocarbon industry has been working for the past few decades to find replacement refrigerants for the ozone depleting chlorofluorocarbons (CFCs) and hydrochlorofluorocarbons (HCFCs) being phased out as a result of the Montreal Protocol. The solution for many applications has been the commercialization of hydrofluorocarbon (HFC) compounds for use as refrigerants, solvents, fire extinguishing agents, blowing agents and propellants. These new compounds, such as HFC refrigerants, HFC-134a and HFC-125 being the most widely used at this time, have zero ozone depletion potential, and thus are not affected by the current regulatory phase-out as a result of the Montreal Protocol.

In addition to ozone depleting concerns, global warming is another environmental concern in many of these applications. Thus, there is a need for compositions that meet both low ozone depletion standards as well as having low global warming potentials. Certain hydrofluoroolefin compositions are believed to meet both goals. Thus, there is also a need for economical manufacturing processes that provide these compositions.

HFO-1234ze ($CF_3CH{=}CHF$) and HFO-1234yf ($CF_3CF{=}CH_2$), both having zero ozone depletion and low global warming potential, have been identified as potential refrigerants. Particularly the E-isomer of HFO-1234ze (HFO-1234zeE) has proven to be useful for refrigeration applications. U.S. Pat. No. 7,862,742 discloses compositions comprising HFO-1234ze and HFO-1234yf. U.S. Pat. No. 9,302,962 discloses methods for making HFO-1234ze. The disclosures of U.S. Pat. Nos. 7,862,742 and 9,302,962 are hereby incorporated by reference in their entirety.

Catalytic dehydrofluorination of HFC-245fa in general produces a mixture of both the E-isomer as well as the Z-isomer of HFC-1234ze. Depending on the particular catalyst chosen, the amount of the Z-isomer can vary between 15% to 23%. Dehydrofluorination in the liquid phase using aqueous solutions of caustic or other strong bases also produces mixture of both isomers. Although the ratio of the two isomers can be shifted somewhat by temperature, about 13% to about 15% of the Z-isomer is typically formed. As the E-isomer is the most useful for refrigeration applications, after separation of the E-isomer from the Z-isomer, the Z-isomer is typically either isomerized to the E-isomer in a separate step or converted back to 245fa through addition of hydrogen fluoride. Both alternatives require additional steps which add cost.

There is a need in this art for art for compositions comprising HFO-1234zeE which can maintain the favorable properties of HFO-1234zeE. There is a further need for a process that can produce compositions of HFO-1234ze and HFO-1234yf that minimizes or eliminates the need for purification or separation steps for removing excess quantities of HFO-1234yf.

BRIEF DESCRIPTION OF THE INVENTION

Described is a fluoropropene composition comprising E-1,3,3,3-tetrafluoropropene, 1,1,3,3,3-pentafluoropropene, and 2,3,3,3-tetrafluoropropene. The total amount of 1,1,3,3,3-pentafluoropropene and 2,3,3,3-tetrafluoropropene in the composition is 1.0 wt. % or less based on the total weight of the fluoropropene composition.

In addition, the present disclosure includes a method of producing a mixture of 1,3,3,3-tetrafluoropropene and 2,3,3,3-tetrafluoropropene, comprising contacting a mixture of 1,1,1,3,3-pentafluoropropane and Z-1,3,3,3-tetrafluoropropene in the gas phase with a catalyst comprising at least one catalyst selected from the group consisting of fluorinated $Cr_2O_3$ and Cr/Ni on fluorinated alumina, preferably in the presence of an oxygen containing gas, to form a mixture comprising Z-1,3,3,3-tetrafluoropropane, E-1,3,3,3-tetrafluoropropene, 1,1,3,3,3-pentafluoropropene, 2,3,3,3-tetrafluoropropene, hydrogen fluoride, and optionally unreacted 1,1,1,3,3-pentafluoropropane. One embodiment the inventive method produces a useful composition without the need for purification or separation steps including steps for removing excess quantities of 2,3,3,3-tetrafluoropropene (HFO-1234yf) or 1,1,3,3,3-pentafluoropropene.

Further still, the present disclosure includes fluoropropene compositions formed from the method of contacting a mixture of 1,1,1,3,3-pentafluoropropane and Z-1,3,3,3-tetrafluoropropene in the gas phase with a catalyst comprising at least one catalyst selected from the group consisting of fluorinated $Cr_2O_3$ and Cr/Ni on fluorinated alumina, optionally in the presence of an oxygen containing gas.

In one embodiment, the inventive process produces a composition comprising HFO-1234ze(E), HFO-1225zc and HFO-1234yf and the composition is useful as a refrigerant. In another embodiment, the composition comprises HFO-1225zc and a near azeotropic composition comprising HFO-1234ze(E) and HFO-1234yf. In a further embodiment, the composition comprises a three component near azeotropic composition comprising HFO-1234ze(E), HFO-1234yf and HFO-1225zc.

One embodiment relates to any combination of the foregoing wherein the 2,3,3,3-tetrafluoropropene is present in the fluoropropene composition in an amount of 0.0001 to 0.9 wt. % based on the total weight of the fluoropropene composition.

One embodiment relates to any combination of the foregoing wherein the 2,3,3,3-tetrafluoropropene is present in the fluoropropene composition in an amount of 0.001 to 0.8 wt. % based on the total weight of the fluoropropene composition.

One embodiment relates to any combination of the foregoing wherein the 2,3,3,3-tetrafluoropropene is present in the fluoropropene composition in an amount of 0.1 to 0.6 wt. % based on the total weight of the fluoropropene composition.

One embodiment relates to any combination of the foregoing wherein the 2,3,3,3-tetrafluoropropene is present in the fluoropropene composition in an amount of 0.3 to 0.4 wt. % based on the total weight of the fluoropropene composition.

One embodiment relates to any combination of the foregoing wherein the 2,3,3,3-tetrafluoropropene is present in an amount of 0.01 to 1.0 mol %.

One embodiment relates to any combination of the foregoing wherein the 2,3,3,3-tetrafluoropropene is present in an amount of 0.1 to 0.9 mol %.

One embodiment relates to any combination of the foregoing wherein the 2,3,3,3-tetrafluoropropene is present in an amount of 0.2 to 0.4 mol %.

One embodiment relates to any combination of the foregoing wherein the 2,3,3,3-tetrafluoropropene is present in an amount of 0.3 to 0.4 mol %.

Another embodiment relates to any combination of the foregoing wherein the 1,1,3,3,3-pentafluoropropene is present in the fluoropropene composition in an amount of 0.0001 to 0.9 wt. %, preferably in an amount of 0.001 to 0.8 wt. %, more preferably in an amount of 0.01 to 0.6 wt. %, and most preferably in an amount of 0.1 to 0.4 wt. % based on the total weight of the fluoropropene composition.

Another embodiment relates to any combination of the foregoing wherein the E-1,3,3,3-tetrafluoropropene is present in the fluoropropene composition in an amount of 50.0 wt. % or more, preferably in an amount of 75.0 wt. % or more, more preferably in an amount of 99.0 wt. % or more, even more preferably in an amount of 99.5 wt. % or more, and most preferably in an amount of 99.8 wt. % or more, based on the total weight of the fluoropropene composition.

Another embodiment relates to any combination of the foregoing the total amount of 2,3,3,3-tetrafluoropropene and 1,1,3,3,3-pentafluoropropene in the fluoropropene composition is 0.001 to 0.9 wt. %, preferably is 0.1 to 0.8 wt. %, and most preferably is 0.3 to 0.5 wt. % based on the total weight of the fluoropropene composition.

One embodiment relates to any combination of the foregoing wherein the fluoropropene composition additionally comprises R-134, preferably in an amount of 1.0 to 40.0 wt. %, more preferably in an amount of 30.0 to 40.0 wt. %, and most preferably in an amount of 35.0 to 40.0 wt. % based on the total weight of the fluoropropene composition.

One embodiment relates to any combination of the foregoing wherein the fluoropropene composition additionally comprises R-1336mzzE and/or R-227ea, preferably in an amount of 15.0 to 20.0 wt. % of R-1336mzzE and of 2.0 to 5.0 wt. % of R-227ea based on the total weight of the fluoropropene composition.

One embodiment relates to any combination of the foregoing wherein the fluoropropene composition additionally optionally comprises one or more of R-143a, R-152a, TFP (trifluoropropyne), R-1233xf, R-1233zd(E), R-1233zd(Z), R236fa, and at least one HFO-1234 isomer including at least one of HFO-1234zc, HFO-1234yc and HFO-1234ye.

One embodiment relates to any combination of the foregoing wherein the sum total of the amounts of R-143a, R-152a, TFP, R-1233xf, R-1233zd(E), and R-1233zd(Z) is between 0.001 mole percent and 2 mole percent, based on the total fluoropropene composition.

One embodiment relates to any combination of the foregoing wherein the fluoropropene composition includes R-1233zd(E) in an amount of 0.7 mole percent to 1.15 mole percent, based on the total fluoropropene composition.

One embodiment relates to any combination of the foregoing wherein the fluoropropene composition includes R-1233zd(Z) in an amount of 0.05 mole percent to 0.25 mole percent, based on the total fluoropropene composition.

One embodiment relates to any combination of the foregoing wherein the fluoropropene composition includes R-143a in an amount of 0.05 mole percent to 0.25 mole percent, based on the total fluoropropene composition.

One embodiment relates to any combination of the foregoing wherein the fluoropropene composition optionally comprises one or more of 1224yd, 1224zc, 1326mxz, 113, 32, 23, trifluoropropyne, 356mff, 1326mxz, HFC-245fa and HFC-245cb.

One embodiment relates to any combination of the foregoing wherein the sum total of the amounts 1224yd, 1224zc, 1326mxz, 113, 32, 23, trifluoropropyne, 356mff, 1326mxz, HFC-245fa and HFC-245cb is between 0.001 mole percent and 2 mole percent, based on the total fluoropropene composition.

One embodiment relates to any combination of the foregoing wherein the composition is near-azeotropic.

A further embodiment of the invention relates to a method of producing a mixture of 1,3,3,3-tetrafluoropropene and 2,3,3,3-tetrafluoropropene, comprising:
(a) contacting a mixture of 1,1,1,3,3-pentafluoropropane and Z-1,3,3,3-tetrafluoropropene in the gas phase with a catalyst comprising at least one catalyst selected from the group consisting of fluorinated $Cr_2O_3$ and Cr/Ni on fluorinated alumina, optionally in the presence of an oxygen containing gas, to form a mixture comprising Z-1,3,3,3-tetrafluoropropene, E-1,3,3,3-tetrafluoropropene, 1,1,3,3,3-pentafluoropropene, 2,3,3,3-tetrafluoropropene, hydrogen fluoride, and optionally unreacted 1,1,1,3,3-pentafluoropropane,
wherein the mixture comprises 0.00001 to 1.0 wt. % 2,3,3,3-tetrafluoropropene and greater than 0 and less than 1.0 wt. % 1,1,3,3,3-pentafluoropropene.

Another embodiment of the invention relates to a method of producing a mixture of a fluoropropene of formula $CF_3CH=CHF$ and a fluoropropene of formula $CF_3CF=CH_2$, comprising:
(a) contacting a mixture of 1,1,1,3,3-pentafluoropropane and Z-1,3,3,3-tetrafluoropropene in the gas phase with a catalyst comprising at least one catalyst selected from the group consisting of fluorinated $Cr_2O_3$ or Cr/Ni on fluorinated alumina, in the presence of an oxygen containing gas, to form a mixture comprising Z-1,3,3,3-tetrafluoropropene, E-1,3,3,3-tetrafluoropropene, 2,3,3,3-tetrafluoropropene, hydrogen fluoride, and optionally unreacted 1,1,1,3,3-pentafluoropropane, wherein the mixture includes 0.00001% to 1.00% 2,3,3,3-tetrafluoropropene.

One embodiment of the invention relates to any combination of the foregoing wherein said mixture of 1,1,1,3,3-pentafluoropropane and 1,3,3,3-tetrafluoropropene comprises at least 7 wt. % Z-1,3,3,3-tetrafluoropropene, preferably at least 10 wt. % Z-1,3,3,3-tetrafluoropropene.

One embodiment of the invention relates to any combination of the foregoing wherein at least 94%, preferably at least 98% of the 1,1,1,3,3-pentafluoropropane is converted to E-1,3,3,3-tetrafluoropropene.

One embodiment of the invention relates to any combination of the foregoing wherein the method further comprises,
(b) recovering Z-1,3,3,3-tetrafluoropropene, or a mixture of Z-1,3,3,3-tetrafluoropropene and 1,1,1,3,3-pentafluoropropane, and recycling Z-1,3,3,3-tetrafluoropropene, or a mixture of Z-1,3,3,3-tetrafluoropropene and 1,1,1,3,3-pentafluoropropane back to step (a).

One embodiment of the invention relates to any combination of the foregoing wherein said hydrogen fluoride produced in step (a) is separated and recovered.

One embodiment of the invention relates to any combination of the foregoing wherein said oxygen containing gas is oxygen or air.

One embodiment of the invention relates to any combination of the foregoing wherein said mixture of 1,1,1,3,3-pentafluoropropane and 1,3,3,3-tetrafluoropropene comprises 0.1 to 0.8 wt. % 2,3,3,3-tetrafluoropropene, preferably 0.2 to 0.6 wt. % 2,3,3,3-tetrafluoropropene, more preferably 0.3 to 0.4 wt. % 2,3,3,3-tetrafluoropropene.

A further embodiment of the invention relates to any combination of the foregoing wherein said mixture of 1,1,1,3,3-pentafluoropropane and Z-1,3,3,3-tetrafluoropropene comprises at least 7% by weight Z-1,3,3,3-tetrafluoropropene.

One embodiment of the invention relates to any combination of the foregoing wherein said mixture of 1,1,1,3,3-pentafluoropropane and Z-1,3,3,3-tetrafluoropropene comprises at least 10% by weight Z-1,3,3,3-tetrafluoropropene.

One embodiment of the invention relates to any combination of the foregoing wherein at least 94% by weight of the 1,1,1,3,3-pentafluoropropane is converted to E-isomer of 1,3,3,3-tetrafloropropene.

One embodiment of the invention relates to any combination of the foregoing wherein at least 98% by weight of the 1,1,1,3,3-pentafluoropropane is converted to E-isomer of 1,3,3,3-tetrafloropropene.

One embodiment of the invention relates to any combination of the foregoing and further comprising recovering Z-1,3,3,3-tetrafluoropropene, or a mixture of Z-1,3,3,3-tetrafluoropropene and 1,1,1,3,3-pentafluoropropane, and recycling Z-1,3,3,3-tetrafluoropropene, or a mixture of Z-1,3,3,3-tetrafluoropropene and 1,1,1,3,3-pentafluoropropane back to step (a).

One embodiment of the invention relates to any combination of the foregoing wherein said hydrogen fluoride produced in step (a) is separated and recovered.

One embodiment of the invention relates to any combination of the foregoing wherein said oxygen containing gas is oxygen, or air.

One embodiment of the invention relates to any combination of the foregoing wherein the mixture includes 0.1 to 0.5 mol % 2,3,3,3-tetrafluoropropene.

One embodiment of the invention relates to any combination of the foregoing wherein the mixture includes 0.2 to 0.4 mol % 2,3,3,3-tetrafluoropropene.

One embodiment of the invention relates to any combination of the foregoing wherein the mixture includes 0.3 to 0.4 mol % 2,3,3,3-tetrafluoropropene.

Another embodiment of the invention relates to any combination of the foregoing methods and to a fluoropropene composition produced by these methods.

A further embodiment of the invention relates to any combination of the foregoing embodiments and comprising a refrigerant composition comprising Z-1,3,3,3-tetrafluoropropene, E-1,3,3,3-tetrafluoropropene, 1,1,3,3,3-pentafluoropropene, and 2,3,3,3-tetrafluoropropene and at least one member selected from the following groups:
(a) comprising one or more of R-143a, R-152a, TFP, R-1233xf, R-1233zd(E), R-1233zd(Z) 1224yd, 1224zc, 1326mxz, 113, 32, 23, 356mff, 1326mxz, HFC-245fa, HFC-245cb 1234zc, 1234yc, 1234ye, 134a, 1225ye (Z and E), 114, 124, and 236fa,
(b) comprising one or more of R-143a, R-152a, TFP, R-1233xf, R-1233zd(E), R-1233zd(Z), 1224yd, 1224zc, 1326mxz, 113, 32, 23, 356mff, 1326mxz, HFC-245fa and HFC-245cb,
(c) comprising one or more of HFC-1234ye, HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, R1336mzz(E), propane, n-butane, isobutane, 2-methylbutane, n-pentane, cyclopentane, dimethylether, $CF_3SCF_3$, $CO_2$, and $CF_3I$;
(d) combinations thereof.

One embodiment of the invention relates the fluoropropene composition further comprising a lubricant selected from the group consisting of mineral oils, such as paraffins, naphthenes and aromatics, alkylaryls, such as linear and branched alkyl alkylbenzenes, synthetic paraffins, synthetic naphthenes, poly(alphaolefins), polyol esters, polyalkylene glycols, and polyvinyl ethers.

One embodiment of the invention relates to a process for treating a surface, comprising:
providing an article; and
contacting the article with a heat transfer media;
wherein the heat transfer media comprises the fluoropropene composition of any combination of the foregoing embodiments.

One embodiment of the invention relates to a process for treating a surface, comprising:
providing a surface; and
contacting the surface with a treatment composition;
wherein the surface includes a treatable material deposited thereon; and
wherein the treatment composition comprises the fluoropropene composition of any combination of the foregoing embodiments.

One embodiment of the invention relates to said process for treating a surface, wherein the treatment composition substantially dissolves the treatable material.

One embodiment of the invention relates to a process forming a composition comprising:
providing a solute;
contacting the solute with a solvent;
wherein the solvent comprises the fluoropropene composition of any combination of the foregoing embodiments.

One embodiment of the invention relates to a refrigeration system, comprising:

an evaporator; a condenser; a compressor; an expansion device; and a heat transfer medium;
wherein the heat transfer medium comprises the fluoropropene composition of any combination of the foregoing embodiments.

One embodiment of the invention relates to a chiller apparatus comprising the fluoropropene composition of any combination of the foregoing embodiments.

One embodiment of the invention relates to the fluoropropene composition of any combination of the foregoing embodiments for use in a chiller apparatus, preferably in a medium temperature chiller apparatus.

One embodiment of the invention relates to the use of the fluoropropene composition of any combination of the foregoing embodiments in a chiller apparatus, preferably in a medium temperature chiller apparatus.

One embodiment of the invention relates to a method of producing cooling, the method comprising: evaporating the composition of any combination of the foregoing embodiments in the vicinity of a body to be cooled and thereafter condensing the composition.

One embodiment of the invention relates to a method for replacing a high GWP refrigerant in a refrigeration, air conditioning, or heat pump apparatus, wherein the high GWP refrigerant is selected from the group consisting of R134a, R22, R123, R11, R245fa, R114, R236fa, R124, R12, R410A, R407C, R417A, R422A, R507A, R502, and R404A, the method comprising providing the composition of any combination of the foregoing embodiments to the refrigeration, air conditioning, or heat pump apparatus that uses, used or is designed to use the high GWP refrigerant.

One embodiment of the invention relates to a refrigeration apparatus, air-conditioning apparatus, or heat pump apparatus containing the composition of any combination of the foregoing embodiments, wherein the refrigeration apparatus preferably is a stationary or mobile refrigeration apparatus, and the air-conditioning apparatus preferably is a mobile air-conditioning apparatus, more preferably an automobile air-conditioning apparatus.

One embodiment of the invention relates to a process for transferring heat, comprising:
providing an article;
contacting the article with a heat transfer media;
wherein the heat transfer media comprises the fluoropropene composition of any combination of the foregoing embodiments and including a near azeotropic composition produced by the inventive method.

One embodiment of the invention relates to a process for treating a surface, comprising:
providing a surface;
contacting the surface with a treatment composition;
wherein the surface includes a treatable material deposited thereon; and wherein the treatment composition comprises the fluoropropene composition of any combination of the foregoing embodiments.

One embodiment of the invention relates to any combination of the foregoing wherein the treatment composition substantially dissolves the treatable material.

One embodiment of the invention relates to a process for forming a composition comprising:
providing a solute; contacting the solute with a solvent;
wherein the solvent comprises the fluoropropene composition of any of the foregoing embodiments.

Another embodiment of the invention relates to a refrigeration system, comprising:
an evaporator; a condenser;
a compressor; an expansion device;
and a heat transfer media;
wherein the heat transfer media comprises the fluoropropene composition of any combination of the foregoing embodiments and including a near azeotropic composition produced by the inventive method.

The foregoing general description and the following detailed description are exemplary and explanatory only and are not restrictive of the invention, as defined in the appended claims. The various embodiments of the invention can be used alone or in combinations with each other. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Described is a fluoropropene composition comprising E-1,3,3,3-tetrafluoropropene, 1,1,3,3,3-pentafluoropropene, and 2,3,3,3-tetrafluoropropene. The total amount of 1,1,3,3,3-pentafluoropropene and 2,3,3,3-tetrafluoropropene in the composition is 1.0 wt. % or less based on the total weight of the fluoropropene composition.

In addition, the present disclosure includes a method of producing a mixture of a fluoropropene of formula $CF_3CH=CHF$, a fluoropropene of formula $CF_2=CHCF_3$ and a fluoropropene of formula $CF_3CF=CH_2$, comprising contacting a mixture of 1,1,1,3,3-pentafluoropropane and Z-1,3,3,3-tetrafluoropropene in the gas phase with a catalyst comprising at least one catalyst selected from the group consisting of fluorinated $Cr_2O_3$ or Cr/Ni on fluoride alumina, optionally in the presence of an oxygen containing gas, to form a mixture comprising Z-1,3,3,3-tetrafluoropropene, E-1,3,3,3,-tetrafluoropropene, 1,1,3,3,3-pentafluoropropene, 2,3,3,3-tetrafluoropropene, and, optionally, unreacted 1,1,1,3,3-pentafluoropropane. Without wishing to be bound by any theory or explanation, a higher contact temperature and/or increased length of catalyst contact time can cause formation of an increased amount of 1,1,3,3,3-pentafluoropropene.

Certain dehydrofluorination reactions are well known in the art. The dehydrofluorination of HFC-245fa has been particularly studied. Both gas phase and liquid phases processes are known. 1,3,3,3-tetrafluoropropene (HFO-1234ze) exists as both a Z-isomer and an E-isomer about the double bond. Both gas phase and liquid phase processes are known to produce a mixture of both the Z- and E-isomers, with the E-isomer predominating. The selectivity for the production of the Z-isomer can vary from about 10% to about 23%, depending on the temperature, and choice of catalyst. The boiling point of the E-isomer at 1 atm is about −19° C., while the boiling point of the Z-isomer is about 9° C. For many uses, the E-isomer is preferred. So as to minimize yield losses in the form of the generally unwanted Z-isomer, it becomes necessary to either add an isomerization step to isomerize the Z-isomer to the E-isomer or add a fluorination step to convert HFO-1234ze(Z) back to HFC-245fa.

The dehydrofluorination reaction according to embodiments of the present disclosure may result in compositions of HFO-1234ze(E), HFO-1225zc and HFO-1234yf that minimizes or eliminates the need for purification or separation steps for removing excess quantities of HFO-1234yf or HFO-1225zc. In some cases, the composition may be azeotropic or near azeotropic or include an azeotropic or near azeotropic composition. By azeotropic compositions it is meant a constant-boiling mixture of two or more substances that behave as a single substance. One manner to characterize an azeotropic composition is that the vapor produced by partial evaporation or distillation of a liquid has the same composition as the liquid from which it is evaporated or distilled (i.e., the mixture distills/refluxes without compositional change). Constant-boiling compositions are characterized as azeotropic because they exhibit either a maximum or minimum boiling point, as compared with that of the non-azeotropic mixture of the same compounds. An azeotropic composition will not fractionate within a refrigeration or air conditioning system during operation. Additionally, an azeotropic composition will not fractionate upon leakage from a refrigeration or air conditioning system. In the situation where one component of a mixture is flammable, fractionation during leakage could lead to a flammable composition either within the system or outside of the system.

By a near-azeotropic composition it is meant to refer to a substantially constant boiling liquid admixture of two or more compounds that behave essentially as a single substance. One manner to characterize a near-azeotropic composition is that the vapor produced by partial evaporation or distillation of a liquid has substantially the same composition as the liquid from which it was evaporated or distilled, that is, the admixture distills/refluxes without substantially compositional change. Another manner to characterize a near-azeotropic composition is that the bubble point vapor pressure and the dew point pressure of the composition at a particular temperature are substantially the same. Herein, a composition of the invention is near-azeotropic if, after 50 weight percent (50 wt. %) of the composition is removed, such as by evaporation or boiling off, the difference in vapor pressure, between the original composition and the composition remaining after 50 weight percent of the original composition has been removed, is less than about 10 percent (10%).

In accordance with one embodiment of the instant invention, the inventive compositions have a flammability rating of A2L as determined by ASHRAE Standard 34 and ASTM E681-09.

Many aspects and embodiments have been described above and are merely exemplary and not limiting. After reading this specification, skilled artisans appreciate that other aspects and embodiments are possible without departing from the scope of the invention.

Other features and benefits of any one or more of the embodiments will be apparent from the following detailed description, and from the claims.

Certain dehydrofluorinations are known in the art and are preferably conducted in the vapor phase. The dehydrofluorination reaction may be conducted in any suitable reaction vessel or reactor, but it should preferably be constructed from materials which are resistant to the corrosive effects of hydrogen fluoride, such as nickel and its alloys, including Hastelloy, Monel, and Inconel, or vessels lined with fluoropolymers. These may be a single tube, or multiple tubes packed with a dehydrofluorination catalyst.

Useful catalysts for the process include chromium-based catalysts such as fluorinated chromium oxide, which catalyst may either be unsupported, or supported on a support such as activated carbon, graphite, fluoride graphite, or alumina fluoride. The chromium catalyst may either be used alone, or in the presence of a co-catalyst selected from nickel, cobalt, manganese, or zinc salt. In one embodiment, a chromium catalyst is high surface area chromium oxide, or chromium/nickel on alumina fluoride ($Cr/Ni/AlF_3$), the preparation of which is reported in European Patent Application EP 0486333A1; the disclosure of which is hereby incorporated by reference. In another embodiment, the catalyst is fluorinated Guignet's green catalyst. Additional suitable catalysts include, but are not limited to, JM 62-2 (chrome catalyst available from Johnson Matthey), LV (chrome catalyst available from Chemours), JM-62-3 (chrome catalyst available from Johnson Matthey), and Newport Chrome (chrome catalyst available from Chemours). The chromium catalysts are preferably activated before use, typically by a procedure whereby the catalyst is heated to from 350° C. to 400° C. under a flow of nitrogen for a period of time, after which the catalyst is heated under a flow of HF and nitrogen or air for an additional period of time.

In one embodiment, the Guignet's Green of the fluoride-activated Guignet's Green catalyst used in the present invention is made by reacting (fusing) boric acid with alkali metal dichromate at 500° C. to 800° C., followed by hydrolysis of the reaction product, whereby said Guignet's Green contains boron, alkali metal, and water of hydration. The usual alkali metal dichromates are the Na and/or K dichromates. The reaction is typically followed by the steps of cooling the reaction product in air, crushing this solid to produce a powder, followed by hydrolysis, filtering, drying, milling, and screening. The Guignet's Green is bluish green, but is known primarily as a green pigment, whereby the pigment is commonly referred to as Guignet's Green. When used as a catalyst, it is also referred to as Guignet's Green as disclosed in U.S. Pat. No. 3,413,363. In U.S. Pat. No. 6,034,289, $Cr_2O_3$ catalysts are disclosed as preferably being in the alpha form, and Guignet's Green is also disclosed as a commercially available green pigment having the composition: $Cr_2O_3$ 79-83%, $H_2O$ 16-18%, $B_2O_5$ 1.5 to 2.7% (sentence bridging cols. 2 and 3) that can be converted to the alpha form (col. 3, l. 3). U.S. Pat. No. 7,985,884 acknowledges the presence of alkali metal in the Guignet's Green in the composition of Guignet's Green disclosed in Example 1: 54.5% Cr, 1.43% B, 3,400 ppm Na, and 120 ppm K. The disclosure of the foregoing patents and patent applications is hereby incorporated by reference.

The physical shape of the catalyst is not critical and may, for example, include pellets, extrudates, powders, or granules. The fluoride activation of the catalyst is preferably carried out on the final shape of the catalyst.

In one embodiment, the instant invention relates to feeding a mixture of HFC-245fa and at least about 10% by weight of the Z-isomer of HFO-1234ze to a dehydrofluorination reactor in the presence of an oxygen containing gas in order to suppress the formation of additional Z-isomer so that the HFC-245fa converted by dehydrofluorination produces substantially only E-HFO-1234ze, HFO-1225zc and HFO-1234yf. Feeding less than about 10% will result in some suppression of the formation of additional Z-1234ze. Feeding greater than about 10% by weight of Z-1234ze simply results in the presence of additional material which must be separated and recycled. The amount of Z-1234ze which is necessary to suppress the further formation of Z-isomer product is dependent to some extent on conversion. At 70% conversion of 245fa, about 10-11% Z-isomer in the feed is required. At 80% conversion, about 13% Z-isomer in the feed is required.

In one embodiment, the reaction vessel can be held at a temperature of between 200° C. and 425° C. In another embodiment, the reaction vessel can be held at a temperature of between 250° C. and 350° C. In yet another embodiment, the reaction vessel can be held at a temperature of between 275° C. and 325° C. or between 350° C. to 410° C.

The reaction pressure can be subatmospheric, atmospheric, or superatmospheric. In one embodiment, the reaction is conducted at a pressure of from 14 psig to about 100 psig. In another embodiment, the reaction is conducted at a pressure of from 14 psig to about 60 psig. In yet another embodiment, the reaction is conducted at a pressure of from 40 psig to about 85 psig. In yet another embodiment, the reaction is conducted at a pressure of from 50 psig to 75 psig. In general, increasing the pressure in the reactor above atmospheric pressure will act to increase the contact time of the reactants in the process. Longer contact times will necessarily increase the degree of conversion in a process, without having to increase temperature.

Depending on the temperature of the reactor, and the contact time, the product mixture from the reactor will contain varying amounts of unreacted HFC-245fa. In certain embodiment, E-1,3,3,3-tetrafluoropropene, 1,1,3,3,3-pentafluoropropane, and HFO-1234yf may be separated from the Z-1,3,3,3-tetrafluoropropene, hydrogen fluoride, and any unreacted HFC-245fa, which are then recycled back to the reactor with additional HFC-245fa. Hydrogen fluoride may be removed by scrubbing, by passing the reactor effluent through a solution of aqueous caustic, or hydrogen fluoride may be removed by distillation. In particularly suitable embodiments, the composition formed from the process of the present disclosure includes both 1,3,3,3-tetrafluoropropene (HFO-1234ze(E)), HFO-1225zc and 2,3,3,3-tetrafluoropropene (HFO-1234yf), which are not separated.

In one embodiment, the reactor feed is preheated in a vaporizer to a temperature of from about 30° C. to about 100° C. In another embodiment, the reactor feed is preheated in a vaporizer to a temperature of from about 30° C. to about 80° C.

In some embodiments, an inert diluent gas is used as a carrier gas for the hydrochlorofluoropropane. In one embodiment, the carrier gas is selected from nitrogen, argon, helium, or carbon dioxide.

In one embodiment, the product mixture includes (on a mol basis) between 0.01% to 1.00% HFO-1234yf, alternatively between 0.05% to 0.95% HFO-1234yf, alternatively between 0.10% to 0.90% HFO-1234yf, alternatively between 0.20% to 0.80% HFO-1234yf, alternatively between 0.01% to 0.20% HFO-1234yf, alternatively between 0.10% to 0.30% HFO-1234yf, alternatively between 0.20% to 0.40% HFO-1234yf, alternatively between 0.30% to 0.50% HFO-1234yf, alternatively between 0.30% to 0.40% HFO-1234yf, alternatively between 0.40% to 0.60% HFC-1234yf, alternatively between 0.50% to 0.70% HFO-1234yf, alternatively between 0.60% to 0.80% HFO-1234yf, alternatively between 0.70% to 0.70% HFO-1234yf, alternatively between 0.80% to 1.00% HFO-1234yf. In another embodiment, the foregoing product mixtures further comprises (on a mole basis) HFO-1225zc wherein the HFO-1225zc is present in an amount equal to 10% of the HFO-1234yf.

In some embodiments, the fluoropropene composition additionally optionally comprises one or more of R-143a, R-152a, TFP, R-1233xf, R-1233zd(E), or R-1233zd(Z). In some embodiments, the sum total of the amounts of R-143a, R-152a, TFP, R-1233xf, R-1233zd(E), and R-1233zd(Z) is between 0.00001 mole percent and 2 mole percent, based on the total fluoropropene composition. In one embodiment, the fluoropropene composition includes R-1233zd(E) in an amount of 0.7 mole percent to 1.15 mole percent, based on the total heat transfer media. In one embodiment, the fluoropropene composition includes R-1233zd(Z) in an amount of 0.05 mole percent to 0.25 mole percent, based on the total heat transfer media. In one embodiment, the fluoropropene composition includes HFO-1234zeZ in an amount of 0.05 mole percent to 0.25 mole percent, based on the total fluoropropene composition. In one embodiment, the fluoropropene composition includes R-143a in an amount of 0.05 mole percent to 0.25 mole percent, based on the total fluoropropene composition.

In other embodiments, the fluoropropene composition optionally comprises one or more of 1224yd, 1224zc, 1326mxz, 113, 32, 23, trifluoro propyne, 356mff, 1326mxz, HFC-245fa and HFC-245cb. The amount of the foregoing compounds can range from about 0.001 to about 1 mole %, about 0.001 to about 0.9 and, in some cases, about 0.001 to about 0.7 mole %.

In one particular embodiment, the sum total of the amounts 1224yd, 1224zc, 1326mxz, 113, 32, 23, trifluoro propyne, 356mff, 1326mxz, HFC-245fa and HFC-245cb is between 0.001 mole percent and 2 mole percent, based on the total fluoropropene composition. The amount of the foregoing compounds can range from about 0.001 to about 0.1 mole %, about 0.001 to about 0.09 and, in some cases, about 0.001 to about 0.07 mole %.

In another particular embodiment, the inventive composition can comprise greater than about 99wt % HFO-1234ze (E) and, for example, 99.5 to 99.99, 99.6 to 99.9 and in some cases about 99.7 to 99.99wt % HFO-1234ze(E) with the remainder comprising HFO-1225zc and HFO-1234yf. The inventive compositions can also contain at least one additional compound selected from the group consisting of HFC-134a, 245cb, 236fa, 1225ye isomers (e.g., E-1225ye and Z-1225ye), HFO-1234ze isomer (e.g., HFO-1234ze(Z)), HFC-245fa, HFC-124, HCFC-114, trifluoropropyne, HFC-152a and HFO-1234 isomers including at least one member selected from the group consisting of HFO-1234zc, HFO-1234yc and HFO-1234ye. The total combined amount of HFO-1225zc, HFO-1234yf and the additional compound(s) can range from greater than 0 to less than about 1 wt. %, and for example, greater than 0 to 0.3, greater than 0 to 0.1 and in some cases greater than 0 to 0.01 mol %. A specific Example of the foregoing composition is shown in Table A below.

TABLE A

| Components | |
|---|---|
| 134a | 3.2 ppm |
| 1225zc | 1.5 ppm |
| 1234yf | 47 ppm |
| 245cb | Coelute with 1234yf |
| 236fa | 1.1 ppm |
| E-1234ze | 99.98 wt.% |
| E-1225ye | 0.6 ppm |
| 1234 isomers* | 6.1 ppm |
| 245fa | 20.5 ppm |
| 124 | 4.6 ppm |
| Z-1234ze | 87 ppm |
| 114 | 14 ppm |
| trifluoropropyne | 1 ppm |
| 152a | 0.5 ppm |
| Z-1225ye | 4 ppm |

*includes HFO-1234zc, HFO-1234yc and HFO-1234ye

The compositions of the present invention may be prepared by any convenient method to combine the desired amounts of the individual components. A preferred method is to weigh the desired component amounts and thereafter combine the components in an appropriate vessel. Agitation may be used, if desired.

An alternative means for making compositions of the present invention may be a method for making a refrigerant blend composition, wherein said refrigerant blend composition comprises a composition as disclosed herein, said method comprising (i) reclaiming a volume of one or more components of a refrigerant composition from at least one refrigerant container, (ii) removing impurities sufficiently to enable reuse of said one or more of the reclaimed components, (iii) and optionally, combining all or part of said reclaimed volume of components with at least one additional refrigerant composition or component.

A refrigerant container may be any container in which is stored a refrigerant blend composition that has been used in a refrigeration apparatus, air-conditioning apparatus, or heat pump apparatus. Said refrigerant container may be the refrigeration apparatus, air-conditioning apparatus, or heat pump apparatus in which the refrigerant blend was used. Additionally, the refrigerant container may be a storage container for collecting reclaimed refrigerant blend components, including but not limited to pressurized gas cylinders.

Residual refrigerant means any amount of refrigerant blend or refrigerant blend component that may be moved out of the refrigerant container by any method known for transferring refrigerant blends or refrigerant blend components.

Impurities may be any component that is in the refrigerant blend or refrigerant blend component due to its use in a refrigeration apparatus, air-conditioning apparatus, or heat pump apparatus. Such impurities include but are not limited to refrigeration lubricants, being those described earlier herein, particulates including but not limited to metal, metal salt or elastomer particles, that may have come out of the refrigeration apparatus, air-conditioning apparatus or heat pump apparatus, and any other contaminants that may adversely affect the performance of the refrigerant blend composition.

Such impurities may be removed sufficiently to allow reuse of the refrigerant blend or refrigerant blend component without adversely affecting the performance or equipment within which the refrigerant blend or refrigerant blend component will be used.

It may be necessary to provide additional refrigerant blend or refrigerant blend component to the residual refrigerant blend or refrigerant blend component in order to produce a composition that meets the specifications required for a given product. For instance, if a refrigerant blend has 3 components in a particular weight percentage range, it may be necessary to add one or more of the components in a given amount in order to restore the composition to within the specification limits.

Compositions of the present invention have zero or low ozone depletion potential and low global warming potential (GWP). Additionally, the compositions of the present invention will have global warming potentials that are less than many hydrofluorocarbon refrigerants currently in use. One aspect of the present invention is to provide a refrigerant with a global warming potential of less than 1000, less than 500, less than 150, less than 100, or less than 50. Another aspect of the present invention is to reduce the net GWP of refrigerant mixtures by adding fluoroolefins to said mixtures.

The compositions of the present invention may be useful as low global warming potential (GWP) replacements for currently used refrigerants, including but not limited to R134a (or HFC-134a, 1,1,1,2-tetrafluoroethane), R22 (or HCFC-22, chlorodifluoromethane), R123 (or HFC-123, 2,2-dichloro-1,1,1-trifluoroethane), R11 (CFC-11, fluorotrichloromethane), R12 (CFC-12, dichlorodifluoromethane), R245fa (or HFC-245fa, 1,1,1,3,3-pentafluoropropane), R114 (or CFC-114, 1,2-dichloro-1,1,2,2-tetrafluoroethane), R236fa (or HFC-236fa, 1,1,1,3,3,3-hexafluoropropane), R124 (or HCFC-124, 2-chloro-1,1,1,2-tetrafluoroethane), R407C (ASHRAE designation for a blend of 52 weight percent R134a, 25 weight percent R125 (pentafluoroethane), and 23 weight percent R32 (difluoromethane), R410A (ASHRAE designation for a blend of 50 weight percent R125 and 50 weight percent R32), R417A, (ASHRAE designation for a blend of 46.6 weight percent R125, 50.0 weight percent R134a, and 3.4 weight percent n-butane), R422A (ASHRAE designation for a blend of 85.1 weight percent R125, 11.5 weight percent R134a, and 3.4 weight percent isobutane), R404A, (ASHRAE designation for a blend of 44 weight percent R125, 52 weight percent R143a (1,1,1-trifluoroethane), and 4.0 weight percent R134a) and R507A (ASHRAE designation for a blend of 50 weight percent R125 and 50 weight percent R143a). Additionally, the compositions of the present invention may be useful as replacements for R12 (CFC-12, dichlorodifluoromethane) or R502 (ASHRAE designation for a blend of 51.2 weight percent CFC-115 (chloropentafluoroethane) and 48.8 weight percent HCFC-22).

The fluoropropene composition may be useful in various applications. In an embodiment, the fluoropropene composition may be used as a refrigerant. In some embodiments, the fluoropropene composition may be used as a replacement for older generation refrigerants (e.g., R404A, R502) to provide a more environmentally friendly composition. In some embodiments, the fluoropropene composition may be a hydrofluoroolefin composition. In an embodiment, the fluoropropene composition includes from 99 mole percent to 99.99 mole percent of 1,3,3,3-tetrafluoropropene (HFO-1234ze)(E) and from 0.0001 mole percent to 1.0 mole percent of 1,1,3,3,3-pentafluoropropene (HFO-1225zc) and 2,3,3,3-tetrafluoropropene (HFO-1234yf). In another embodiment, the fluoropropene composition is a near azeotropic composition that is substantially free of HFO-1234ze (Z). By substantially free, it is meant that the fluoropropene composition contains less than about 1000 ppm, less than about 500 ppm and typically less than about 100 ppm, HFO-1234ze(Z).

Often replacement refrigerants are most useful if capable of being used in the original refrigeration equipment designed for a different refrigerant. The compositions of the present invention may be useful as replacements for the above-mentioned refrigerants in original equipment. Additionally, the compositions of the present invention may be useful as replacements for the above-mentioned refrigerants in equipment designed to use the above-mentioned refrigerants.

In one embodiment, the foregoing inventive fluoropropene compositions can be blended with other fluorochemicals. This embodiment of the present invention relates to a refrigerant composition comprising the inventive composition (e.g., HFO-1234ze(E), HFO-1225zc and HFO-1234yf) and at least one compound selected from the group consisting of: HFC-1234ye, HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, R1336mzz(E), propane, n-butane, isobutane, 2-methylbutane, n-pentane, cyclopentane, dimethylether, $CF_3SCF_3$, $CO_2$, $CF_3I$ and combinations thereof.

In one embodiment, the foregoing inventive fluoropropene compositions are combined with at least one additional refrigerant comprising a member selected from the group consisting of R32, R125, R134, R134a, 227ea, and R1336mzz(E). The amount of the at least one additional refrigerant can range from about 5 to about 95, about 50 to about 90 and in some cases about 60 to about 80wt. % of the refrigerant composition. In one particular embodiment, the inventive fluoropropene compositions can be employed as a source of HFO-1234ze for preparing R444A, R444B, R446A/B, R447B, R448A, R450A, R456, R459A/B, R460A/B/C, R464A, 515A and 515B.

In some embodiments, the foregoing fluoropropene compositions may be used in a refrigeration system. One embodiment of a refrigeration system includes an evaporator, a condenser, a compressor, an expansion device, and a heat transfer medium. The heat transfer medium includes the fluoropropene composition. That is, the compositions of the present invention may further comprise a lubricant. The heat transfer medium or the compositions of the present invention can further comprise at least one lubricant including those suitable for use with refrigeration or air-conditioning apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic or ring structure saturated hydrocarbons, which may be paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and naphthenes, silicones, and poly-alpha-olefins. Representative conventional lubricants of the present invention are the commercially available BVM 100 N (paraffinic mineral oil sold by BVA Oils), naphthenic mineral oil commercially available under the trademark from Suniso® 3GS and Suniso® 5GS by Crompton Co., naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500 and branched alkylbenzene, sold by Nippon Oil as HAB 22.

In one embodiment, the lubricant component can comprise those which have been designed for use with refrigerants and are miscible with the fluoropropene compositions of the present invention under compression refrigeration and air-conditioning apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Michigan), and polyvinyl ethers (PVEs).

Lubricants of the present invention are selected by considering a given compressor's requirements and the environment to which the lubricant will be exposed. The amount of lubricant can range from about 1 to about 50, about 1 to about 20 and in some cases about 1 to about 3 weight percent of a refrigerant composition. In one particular embodiment, the foregoing refrigerant compositions are combined with a PAG lubricant for usage in an automotive A/C system having an internal combustion engine. In another particular embodiment, the foregoing refrigerant compositions are combined with a POE lubricant for usage in an automotive A/C system having an electric or hybrid electric drive train.

In one embodiment, a refrigerant composition comprises the inventive near azeotropic composition, at least one lubricant and at least one additive which can improve the refrigerant and air-conditioning system lifetime and compressor durability are desirable. In one aspect of the invention, the foregoing refrigerant compositions comprise at least one member selected from the group consisting of acid scavengers, performance enhancers, and flame suppressants.

In another embodiment, the fluoropropene composition may be used in a process to transfer heat. The process may include providing an article and contacting the article with a heat transfer media including the fluoropropene composition. In some embodiments, the article may include electrical equipment (e.g., circuit board, computer, display, semiconductor chip, or transformer), a heat transfer surface (e.g., heat sink), or article of clothing (e.g., a body suit).

In another embodiment, the fluoropropene composition may be used in a process for treating a surface. The process may include providing a surface having a treatable material deposited thereon and contacting the surface with a treatment composition including the fluoropropene composition. In some embodiments, the treatment composition may substantially dissolve the treatable material.

In another embodiment, the fluoropropene composition may be used in a process for forming a composition. The process includes providing a solute and contacting the solute with a solvent including the fluoropropene composition. In some embodiments, the fluoropropene composition may substantially dissolve the solute.

The present invention further relates to a chiller apparatus comprising the fluoropropene composition of the present invention.

The present invention further relates to the fluoropropene composition of the present invention for use in a chiller apparatus.

The chiller apparatus as referred to herein is preferably a low temperature chiller apparatus or a medium temperature chiller apparatus, more preferably a medium temperature chiller apparatus. Low temperature generally refers to an evaporator temperature of around or below about −17.8° C. (0° F.), whereas medium temperature generally refers to evaporator temperature of around 0° C. to 10° C. or below.

The present invention further relates to the use of the fluoropropene composition of the present invention in a chiller apparatus, preferably in a medium temperature chiller apparatus.

A chiller is a type of air conditioning/refrigeration apparatus. Chillers are described for example in PCT application No. PCT/US2011/032072 (which corresponds to US 2013/025299; the disclosure of which is hereby incorporated by reference). The present disclosure is directed for example to a vapor compression chiller. Such vapor compression chillers may be either flooded evaporator chillers or direct expansion chillers. Both a flooded evaporator chiller and a direct expansion chiller may be air-cooled or water-cooled. In the embodiment where chillers are water cooled, such chillers are generally associated with cooling towers for heat rejection from the system. In the embodiment where chillers are air-cooled, the chillers are equipped with refrigerant-to-air finned-tube condenser coils and fans to reject heat from the system. Air-cooled chiller systems are generally less costly than equivalent-capacity water-cooled chiller systems including cooling tower and water pump. However, water-cooled systems can be more efficient under many operating conditions due to lower condensing temperatures.

Chillers, including both flooded evaporator and direct expansion chillers, may be coupled with an air handling and distribution system to provide comfort air conditioning (cooling and dehumidifying the air) to large commercial buildings, including hotels, office buildings, hospitals, universities, etc. In another embodiment, chillers, most likely air-cooled direct expansion chillers, have found additional utility in naval submarines and surface vessels.

To illustrate how chillers operate, reference is made to the Figures of PCT application No. PCT/US2011/032072. A water-cooled, flooded evaporator chiller is shown illustrated in FIG. 1. In this chiller a first heat transfer medium, which is a warm liquid, which comprises water, and, in some embodiments, additives, such as a glycol (e.g., ethylene glycol or propylene glycol), enters the chiller from a cooling system, such as a building cooling system, shown entering at arrow 3, through a coil or tube bundle 9, in an evaporator 6, which has an inlet and an outlet. The warm first heat transfer medium is delivered to the evaporator, where it is cooled by liquid refrigerant, which is shown in the lower portion of the evaporator. The liquid refrigerant evaporates at a temperature lower than the temperature of the warm first heat transfer medium which flows through coil 9. The cooled first heat transfer medium re-circulates back to the building cooling system, as shown by arrow 4, via a return portion of coil 9. The liquid refrigerant, shown in the lower portion of evaporator 6 in FIG. 1, vaporizes and is drawn into a compressor 7, which increases the pressure and temperature of the refrigerant vapor. The compressor compresses this vapor so that it may be condensed in a condenser 5 at a higher pressure and temperature than the pressure and temperature of the refrigerant vapor when it comes out of the evaporator. A second heat transfer medium, which is a liquid in the case of a water-cooled chiller, enters the condenser via a coil or tube bundle 10 in condenser 5 from a cooling tower at arrow 1 in FIG. 1. The second heat transfer medium is warmed in the process and returned via a return loop of coil 10 and arrow 2 to a cooling tower or to the environment. This second heat transfer medium cools the vapor in the condenser and causes the vapor to condense to liquid refrigerant, so that there is liquid refrigerant in the lower portion of the condenser as shown in FIG. 1. The condensed liquid refrigerant in the condenser flows back to the evaporator through an expansion device 8, which may be an orifice, capillary tube, or expansion valve. Expansion device 8 reduces the pressure of the liquid refrigerant, and converts the liquid refrigerant partially to vapor, that is to say that the liquid refrigerant flashes as pressure drops between the condenser and the evaporator. Flashing cools the refrigerant, i.e., both the liquid refrigerant and the refrigerant vapor to the saturation temperature at evaporator pressure, so that both liquid refrigerant and refrigerant vapor are present in the evaporator.

It should be noted that for a single component refrigerant composition, the composition of the vapor refrigerant in the evaporator is the same as the composition of the liquid refrigerant in the evaporator. In this case, evaporation will occur at a constant temperature. However, if a refrigerant blend (or mixture) is used, as in the present invention, the liquid refrigerant and the refrigerant vapor in the evaporator (or in the condenser) may have different compositions. This may lead to inefficient systems and difficulties in servicing the equipment, thus a single component refrigerant is more desirable. An azeotrope or azeotrope-like composition will function essentially as a single component refrigerant in a chiller, such that the liquid composition and the vapor composition are essentially the same reducing any inefficiencies that might arise from the use of a non-azeotropic or non-azeotrope-like composition.

Chillers with cooling capacities above 700 KW generally employ flooded evaporators, where the refrigerant in the evaporator and the condenser surrounds a coil or tube bundle or other conduit for the heat transfer medium (i.e., the refrigerant is on the shell side). Flooded evaporators require larger charges of refrigerant but permit closer approach temperatures and higher efficiencies. Chillers with capacities below 700 KW commonly employ evaporators with refrigerant flowing inside the tubes and heat transfer medium in the evaporator and the condenser surrounding the tubes, i.e., the heat transfer medium is on the shell side. Such chillers are called direct-expansion (DX) chillers. One embodiment of a water-cooled direct expansion chiller is illustrated in FIG. 2. In the chiller as illustrated in FIG. 2, first liquid heat transfer medium, which is a warm liquid, such as warm water, enters an evaporator 6' at inlet 14. Mostly liquid refrigerant (with a small amount of refrigerant vapor) enters a coil or tube bundle 9' in the evaporator at arrow 3' and evaporates. As a result, first liquid heat transfer medium is cooled in the evaporator, and a cooled first liquid heat transfer medium exits the evaporator at outlet 16, and is sent to a body to be cooled, such as a building. In this embodiment of FIG. 2, it is this cooled first liquid heat transfer medium that cools the building or other body to be cooled. The refrigerant vapor exits the evaporator at arrow 4' and is sent to a compressor 7', where it is compressed and exits as high temperature, high pressure refrigerant vapor. This refrigerant vapor enters a condenser 5' through a condenser coil 10' or tube bundle at 1'. The refrigerant vapor is cooled by a second liquid heat transfer medium, such as water, in the condenser and becomes a liquid. The second liquid heat transfer medium enters the condenser through a condenser heat transfer medium inlet 20. The second liquid heat transfer medium extracts heat from the condensing refrigerant vapor, which becomes liquid refrigerant, and this warms the second liquid heat transfer medium in the condenser. The second liquid heat transfer medium exits through the condenser heat transfer medium outlet 18. The condensed refrigerant liquid exits the condenser through lower coil 10' as shown in FIG. 2 and flows through an expansion device 12, which may be an orifice, capillary tube, or expansion valve. Expansion device 12 reduces the pressure of the liquid refrigerant. A small amount of vapor, produced as a result of the expansion, enters the evaporator with liquid refrigerant through coil 9' and the cycle repeats.

Vapor-compression chillers may be identified by the type of compressor they employ. The present invention includes chillers utilizing centrifugal compressors as well as positive displacement compressors. In one embodiment, the compositions as disclosed herein are useful in chillers which utilizes a centrifugal compressor, herein referred to as a centrifugal chiller.

A centrifugal compressor uses rotating elements to accelerate the refrigerant radially, and typically includes an impeller and diffuser housed in a casing. Centrifugal compressors usually take fluid in at an impeller eye, or central inlet of a circulating impeller, and accelerate it radially outward. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at its outermost tip and is related to the diameter of the impeller and its revolutions per minute. The capacity of the centrifugal compressor is determined by the size of the passages through the impeller. This makes the size of the compressor more dependent on the pressure required than the capacity.

In another embodiment, the compositions as disclosed herein are useful in positive displacement chillers, which utilize positive displacement compressors, either reciprocating, screw, or scroll compressors. A chiller which utilizes a screw compressor will be hereinafter referred to as a screw chiller.

Positive displacement compressors draw vapor into a chamber, and the chamber decreases in volume to compress the vapor. After being compressed, the vapor is forced from the chamber by further decreasing the volume of the chamber to zero or nearly zero.

Reciprocating compressors use pistons driven by a crankshaft. They can be either stationary or portable, can be single or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (>5000 psi or 35 MPa).

Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 KW) and from low pressure to very high pressure (>1200 psi or 8.3 MPa).

Scroll compressors are similar to screw compressors and include two interleaved spiral-shaped scrolls to compress the gas. The output is more pulsed than that of a rotary screw compressor.

For chillers which use scroll compressors or reciprocating compressors, capacities below 150 KW, brazed-plate heat exchangers are commonly used for evaporators instead of the shell-and-tube heat exchangers employed in larger chillers. Brazed-plate heat exchangers reduce system volume and refrigerant charge.

The present invention further relates to a process for producing cooling comprising evaporating the compositions of the present invention in the vicinity of a body to be cooled, and thereafter condensing said compositions.

The present invention further relates to a refrigeration, air-conditioning, or heat pump apparatus containing a composition of the present invention.

The present invention further relates to a mobile air-conditioning apparatus containing a composition of the present invention.

As used herein, mobile refrigeration apparatus or mobile air-conditioning apparatus refers to any refrigeration or air-conditioning apparatus incorporated into a transportation unit for the road, rail, sea or air. In addition, apparatus, which are meant to provide refrigeration or air-conditioning for a system independent of any moving carrier, known as "intermodal" systems, are included in the present invention. Such intermodal systems include "containers" (combined sea/land transport) as well as "swap bodies" (combined road and rail transport). The present invention is particularly useful for road transport refrigerating or air-conditioning apparatus, such as automobile air-conditioning apparatus or refrigerated road transport equipment.

In another embodiment, the present invention relates to blowing agent compositions comprising the fluoroolefin-containing compositions (e.g., near azeotropic containing compositions), as described herein for use in preparing foams. In other embodiments the invention provides foamable compositions, and preferably polyurethane and polyisocyanate foam compositions, and method of preparing foams. In such foam embodiments, one or more of the present fluoroolefin-containing compositions are included as a blowing agent in foamable compositions, which composition preferably includes one or more additional components capable of reacting and foaming under the proper conditions to form a foam or cellular structure. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

The present invention further relates to a method of forming a foam comprising: (a) adding to a foamable composition a fluoroolefin-containing composition of the present invention; and (b) reacting the foamable composition under conditions effective to form a foam.

Another embodiment of the present invention relates to the use of the fluoroolefin-containing compositions as described herein (e.g., compositions of HFO-1234ze(E), HFO-1225zc and HFO-1234yf, which may be near-azeotropic), for use as propellants in sprayable compositions. Additionally, the present invention relates to a sprayable composition comprising the fluoroolefin-containing compositions as described herein. The active ingredient to be sprayed together with inert ingredients, solvents and other materials may also be present in a sprayable composition. Preferably, the sprayable composition is an aerosol. Suitable active materials to be sprayed include, without limitations, cosmetic materials, such as deodorants, perfumes, hair sprays, cleaners, and polishing agents as well as medicinal materials such as anti-asthma and anti-halitosis medications.

The present invention further relates to a process for producing aerosol products comprising the step of adding a fluoroolefin-containing composition as described herein to active ingredients in an aerosol container, wherein said composition functions as a propellant.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim, such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole. The transitional phrase "consisting essentially of" is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term 'consisting essentially of' occupies a middle ground between "comprising" and 'consisting of'.

In the foregoing combinations of inventive embodiments, the compositions can comprise, consist essentially of or consist of HFO-1234ze(E), HFO-1225zc and HFO-1234yf.

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

EXAMPLES

The concepts described herein will be further described in the following examples, which do not limit the scope of the invention described in the claims.

Example 1

Table 1 shows the cooling performance of various refrigerant compositions comprising HFO-1234ze(E), HFO-1225zc and HFO-1234yf, by comparing cooling capacity (CAP_c) and energy efficiency (COP_c) to HFO-1234ze(E). The data are based on the following conditions.

Condenser temperature=47.0° C.
Evaporator temperature=7.0° C.
Subcool=12.0 K
Superheat=3.0 K
Compressor efficiency=0.7
Average Heat Exchanger Temperature Set Points
Superheat is included in refrigeration effect
Cooling load=3.517 kW
Compressor displacement=0.00283168438736 (m^3/min)

TABLE 1

| COMPOSITION (MASS RATIO) | CAP_C (KJ/M^3) | COP_C |
|---|---|---|
| R-1234zeE | 2111.4 | 4.402 |
| R-1234yf_R-1225zc_R-1225zc_R-1234zeE<br>W = _0.0_0.005_0.995 | 2112.4 | 4.402 |
| R-1234yf_R-1225zc_R-1234zeE<br>W = _0.00125_0.00375_0.995 | 2113.3 | 4.402 |
| R-1234yf_R-1225zc_R-1234zeE<br>W = _0.0025_0.0025_0.995 | 2114.2 | 4.402 |
| R-1234yf_R-1225zc_R-1234zeE<br>W = _0.00375_0.00125_0.995 | 2115.2 | 4.402 |
| R-1234yf_R-1225zc_R-1234zeE<br>W = _0.005_0.0_0.995 | 2116.1 | 4.402 |
| R-515B | 2100.4 | 4.393 |
| R-1225zc_R-1234yf_R-1234zeE_R-227ea<br>W = _0.0_0.00456_0.90644_0.089 | 2104.6 | 4.392 |
| R-1225zc_R-1234yf_R-1234zeE_R-227ea<br>W = _0.00114_0.00342_0.90644_0.089 | 2103.7 | 4.392 |
| R-1225zc_R-1234yf_R-1234zeE_R-227ea<br>W = _0.00228_0.00228_0.90644_0.089 | 2102.9 | 4.392 |
| R-1225zc_R-1234yf_R-1234zeE_R-227ea<br>W = _0.00342_0.00114_0.90644_0.089 | 2102.1 | 4.392 |
| R-1225zc_R-1234yf_R-1234zeE_R-227ea<br>W = _0.00456_0.0_0.90644_0.089 | 2101.3 | 4.393 |
| R-515A | 2096.1 | 4.389 |
| R-1225zc_R-1234yf_R-1234zeE_R-227ea<br>W = _0.0_0.0044_0.8756_0.12 | 2100.1 | 4.389 |

TABLE 1-continued

| COMPOSITION (MASS RATIO) | CAP_C (KJ/M^3) | COP_C |
|---|---|---|
| R-1225zc_R-1234yf_R-1234zeE_R-227ea W = _0.0011_0.0033_0.8756_0.12 | 2099.3 | 4.389 |
| R-1225zc_R-1234yf_R-1234zeE_R-227ea W = _0.0022_0.0022_0.8756_0.12 | 2098.5 | 4.389 |
| R-1225zc_R-1234yf_R-1234zeE_R-227ea W = _0.0033_0.0011_0.8756_0.12 | 2097.7 | 4.389 |
| R-1225zc_R-1234yf_R-1234zeE_R-227ea W = _0.0044_0.0_0.8756_0.12 | 2096.9 | 4.389 |
| R-450A | 2465.1 | 4.394 |
| R-1225zc_R-1234yf_R-1234zeE_R-134a W = _0.0_0.0029_0.5771_0.42 | 2467.7 | 4.394 |
| R-1225zc_R-1234yf_R-1234zeE_R-134a W = _0.00073_0.00218_0.5771_0.42 | 2467.2 | 4.394 |
| R-1225zc_R-1234yf_R-1234zeE_R-134a W = _0.00145_0.00145_0.5771_0.42 | 2466.8 | 4.394 |
| R-1225zc_R-1234yf_R-1234zeE_R-134a W = _0.00218_0.00073_0.5771_0.42 | 2466.3 | 4.394 |
| R-1225zc_R-1234yf_R-1234zeE_R-134a W = _0.0029_0.0_0.5771_0.42 | 2465.9 | 4.394 |
| Refrigerant A (R-1234zeE_R-134 0.63 0.37) | 2276.7 | 4.421 |
| R-1225zc_R-1234yf_R-1234zeE_R-134 W = _0.0_0.00315_0.62685_0.37 | 2279.3 | 4.421 |
| R-1225zc_R-1234yf_R-1234zeE_R-134 W = _0.00079_0.00236_0.62685_0.37 | 2278.9 | 4.421 |
| R-1225zc_R-1234yf_R-1234zeE_R-134 W = _0.00157_0.00157_0.62685_0.37 | 2278.5 | 4.421 |
| R-1225zc_R-1234yf_R-1234zeE_R-134 W = _0.00236_0.00079_0.62685_0.37 | 2278.1 | 4.421 |
| R-1225zc_R-1234yf_R-1234zeE-R-134 W = _0.00315_0.0_0.62685_0.37 | 2277.7 | 4.421 |
| Refrigerant B (R-1234zeE_R-1336mzzE_R-227ea W = 0.787 0.17_0.043) | 1885.4 | 4.409 |
| R-1225zc_R-1234yf_R-1234zeE_ R-1336mzzE_R-227ea W = _0.0_0.00393_0.78307_0.17_0.043 | 1888.8 | 4.408 |
| R-1225zc_R-1234yf_R-1234zeE_ R-1336mzzE_R-227ea_ W = _0.00098_0.00295_0.78307_0.17_0.043 | 1888.1 | 4.408 |
| R-1225zc_R-1234yf_R-1234zeE_ R-1336mzzE_R-227ea_ W = _0.00197_0.00197_0.78307_0.17_0.043 | 1887.4 | 4.408 |
| R-1225zc_R-1234yf_R-1234zeE_ R-1336mzzE_R-227ea_ W = _0.00295_0.00098_0.78307_0.17_0.043 | 1886.7 | 4.408 |
| R-1225zc_R-1234yf_R-1234zeE_ R-1336mzzE_R-227ea W = _0.00393_0.0_0.78307_0.17_0.043 | 1886.1 | 4.408 |
| R-448A | 4718.7 | 4.214 |
| R-1225zc_R-1234yf_R-1234zeE_R-125_ R-134a_R-32 W = _0.0_0.20035_0.06965_0.26_0.21_0.26 | 4719 | 4.214 |
| R-1225zc_R-1234yf_R-1234zeE_R-125_ R-134a_R-32 W = _9e−05_0.20026_0.06965_0.26_0.21_0.26 | 4719 | 4.214 |
| R-1225zc_R-1234yf_R-1234zeE_R-125_R-134a_R-32 W = _0.00017_0.20017_0.06965_0.26_0.21_0.26 | 4719 | 4.214 |
| R-1225zc_R-1234yf_R-1234zeE_R-125_ R-134a_R-32 W = _0.00026_0.2009_0.06965_0.26_0.21_0.26 | 4719 | 4.214 |
| R-1225zc_R-1234yf_R-1234zeE_R-125_R-134a_R-32 W = _0.00035_0.2_0.06965_0.26_0.21_0.26 | 4718.9 | 4.214 |

Several compositions, and in particular the composition comprising HFO-1234ze(E), HFO-1225zc and HFO-1234yf, have higher capacity than pure HFO-1234ze(E) or others such as R-515B and R-450A. Energy efficiency (COP) for the present compositions in many cases is also similar to HFO-1234ze(E) compositions indicating these could be replacement refrigerants for HFO-1234ze(E) or for others such as R-515B and R-450A in refrigeration and air-conditioning apparatus applications, and in stationary air-conditioning applications in particular.

Example 2

Table 2 contains data on the impact of vapor leakage for various refrigerant compositions comprising HFO-1234ze(E), HFO-1225zc and HFO-1234yf, by comparing to HFO-1234ze(E).

The following conditions were applied: A vessel is charged with an initial composition at a temperature of 25° C., and the initial vapor pressure of the composition is measured. The composition is allowed to leak from the vessel, while the temperature is held constant, until 50 weight percent of the initial composition is removed, at which time the vapor pressure of the composition remaining in the vessel is measured. Delta P % gives the relative pressure difference in %.

TABLE 2

| Composition (mass ratio) | delta P % 50% mass leak at 25° C. |
|---|---|
| R-1234zeE | 0.000 |
| R-1234yf_R-1225zc_R-1234zeE<br>W = _0.0_0.005_0.995 | −0.023 |
| R-1234yf_R-1225zc_R-1234zeE<br>W = _0.00125_0.00375_0.995 | −0.089 |
| R-1234yf_R-1225zc_R-1234zeE<br>W = _0.0025_0.0025_0.995 | −0.158 |
| R-1234yf_R-1225zc_R-1234zeE<br>W = _0.00375_0.00125_0.995 | −0.220 |
| R-1234yf_R-1225zc_R-1234zeE<br>W = _0.005_0.0_0.995 | −0.285 |
| R-515B | −0.001 |
| R-1225zc_R-1234yf_R-1234zeE_R-227ea<br>W = _0.0_0.00456_0.90644_0.089 | −0.255 |
| R-1225zc_R-1234yf_R-1234zeE_R-227ea<br>W = _0.00114_0.00342_0.90644_0.089 | −0.197 |
| R-1225zc_R-1234yf_R-1234zeE_R-227ea<br>W = _0.00228_0.00228_0.90644_0.089 | −0.139 |
| R-1225zc_R-1234yf_R-1234zeE_R-227ea<br>W = _0.00342_0.00114_0.90644_0.089 | −0.080 |
| R-1225zc_R-1234yf_R-1234zeE_R-227ea<br>W = _0.00456_0.0_0.90644_0.089 | −0.021 |
| R-515A | −0.003 |
| R-1225zc_R-1234yf_R-1234zeE_R-227ea<br>W = _0.0_0.0044_0.8756_0.12 | −0.245 |
| R-1225zc_R-1234yf_R-1234zeE_R-227ea<br>W = _0.0011_0.0033_0.8756_0.12 | −0.190 |
| R-1225zc_R-1234yf_R-1234zeE_R-227ea<br>W = _0.0022_0.0022_0.8756_0.12 | −0.134 |
| R-1225zc_R-1234yf_R-1234zeE_R-227ea<br>W = _0.0033_0.0011_0.8756_0.12 | −0.078 |
| R-1225zc_R-1234yf_R-1234zeE_R-227ea<br>W = _0.0044_0.0_0.8756_0.12 | −0.022 |
| R-450A | −1.86 |
| R-1225zc_R-1234yf_R-1234zeE_R-134a<br>W = _0.0_0.0029_0.5771_0.42 | −1.92 |
| R-1225zc_R-1234yf_R-1234zeE_R-134a<br>W = _0.00073_0.00218_0.5771_0.42 | −1.90 |
| R-1225zc_R-1234yf_R-1234zeE_R-134a<br>W = _0.00145_0.00145_0.5771_0.42 | −1.89 |
| R-1225zc_R-1234yf_R-1234zeE_R-134a<br>W = _0.00218_0.00073_0.42 | −1.87 |
| R-1225zc_R-1234yf_R-1234zeE_R-134a<br>W = _0.0029_0.0_0.5771_0.42 | −1.86 |
| Refrigerant A (R-1234ze E_R-134 0.63 0.37) | −0.084 |
| R-1225zc_R-1234yf_R-1234zeE_R-134<br>W = _0.0_0.00315_0.62685_0.37 | −0.199 |
| R-1225zc_R-1234yf_R-1234zeE_R-134<br>W = _0.00079_0.00236_0.62685_0.37 | −0.175 |
| R-1225zc_R-1234yf_R-1234zeE_R-134<br>W = _0.00157_0.00157_0.62685_0.37 | −0.151 |
| R-1225zc_R-1234yf_R-1234zeE_R-134<br>W = _0.00236_0.00079_0.62685_0.37 | −0.127 |
| R-1225zc_R-1234yf_R-1234zeE_R-134<br>W = _0.00315_0.0_0.62685_0.37 | −0.103 |
| Refrigerant B (R-1234zeE_R-1336mzzE_R-227ea W = 0.787 0.17_0.043) | −5.82 |
| R-1225zc_R-1234yf_R-1234zeE_R-1336mzzE_R-227ea<br>W = _0.0_0.00393_0.78307_0.17_0.043 | −6.10 |
| R-1225zc_R-1234yf_R-1234zeE_R-1336mzzE_R-227ea_<br>W = _0.00098_0.00295_0.78307_0.17_0.043 | −6.04 |
| R-1225zc_R-1234yf_R-1234zeE_R-1336mzzE_R-227ea_<br>W = _0.00197_0.00197_0.78307_0.17_0.043 | −5.98 |
| R-1225zc_R-1234yf_R-1234zeE_R-1336mzzE_R-227ea<br>W = _0.00295_0.00098_0.78307_0.17_0.043 | −5.91 |

TABLE 2-continued

| Composition (mass ratio) | delta P % 50% mass leak at 25° C. |
|---|---|
| R-1225zc_R-1234yf_R-1234zeE_R-1336mzzE_R-227ea<br>W = _0.00393_0.0_0.78307_0.17_0.043 | −5.85 |
| R-448A | −14.4 |
| R-1225zc_R-1234yf_R-1234zeE_R-125_R-134a_R-32<br>W = _0.0_0.20035_0.06965_0.26_0.21_0.26 | −14.3 |
| R-1225zc_R-1234yf_R-1234zeE_R-125_R-134a_R-32<br>W = _9e−05_0.20026_0.06965_0.26_0.21_0.26 | −14.3 |
| R-1225zc_R-1234yf_R-1234zeE_R-125_R-134a_R-32<br>W = _0.00017_0.20017_0.06965_0.26_0.21_0.26 | −14.3 |
| R-1225zc_R-1234yf_R-1234zeE_R-125_R-134a_R-32<br>W = _0.00026_0.20009_0.06965_0.26_0.21_0.26 | −14.4 |
| R-1225zc_R-1234yf_R-1234zeE_R-125_R-134a_R-32<br>W = _0.00035_0.2_0.06965_0.26_0.21_0.26 | −14.4 |

The difference in vapor pressure between the original composition and the composition remaining after 50 weight percent is removed is less than about 10 percent for several compositions of the present invention. This indicates that several of the compositions of the present invention would be azeotropic or near-azeotropic.

Example 3

Table 3 shows the cooling performance of an inventive refrigerant composition under typical medium temperature chiller apparatus conditions. The data are based on the following conditions.

Condenser temperature=37.78° C.

Evaporator temperature=4.44° C.

Superheat=6.0 K

Compressor efficiency=0.85

Average Heat Exchanger Temperature Set Points

100% of superheat is included in refrigeration effect

Vapor Molar Quality Entering Evaporator: q_4 cooling load=1.00004194 KW compressor displacement=0.1 (m^3/min)

Also included are GWP values for an inventive composition compared to HFO-1234ze(E).

TABLE 3

| Composition (mass ratio) | CAP_c (kJ/m^3) | COP_c | GWP (AR 5) |
|---|---|---|---|
| R-1234zeE | 1870 | 5.928 | 1 |
| R-1234yf_R-1225zc_R-124zeE<br>W = _0.0_0.005_0.995 | 1874.1 | 5.926 | 1 |
| R-1234yf_R-1225zc_R-1234zeE<br>W = _0.00125_0.00375_0.995 | 1873.3 | 5.926 | 1 |
| R-1234yf_R-1225zc_R-1234zeE<br>W = _0.0025_0.0025_0.995 | 1872.5 | 5.927 | 1 |
| R-1234yf_R-1225zc_R-1234zeE<br>W = _0.00375_0.00125_0.995 | 1871.7 | 5.927 | 1 |
| R-1234yf_R-1225zc_R-1234zeE<br>W = _0.005_0.0_0.995 | 1870.9 | 5.927 | 1 |

As apparent, the composition comprising HFO-1234ze (E), HFO-1225zc and HFO-1234yf, has higher capacity than pure HFO-1234ze(E), but still maintains the very low GWP of HFO-1234ze(E). Energy efficiency (COP) is also comparable to HFO-1234ze(E) indicating the inventive compositions could be good replacement refrigerants for HFO-1234ze(E) in medium temperature chiller apparatus applications.

Example 4

According to ASHRAE Standard, heat of combustion is a measure for the influence of compounds on flammability properties of materials. The results for various refrigerant compositions comprising HFO-1234ze(E), HFO-1225zc and HFO-1234yf, compared to HFO-1234ze(E) are given in Table 4.

TABLE 4

| Composition (mass ratio) | Heat of Combustion (kJ/gm) |
| --- | --- |
| R-1234zeE | −10.2554 |
| R-1234yf_R-1225zc_R-1234zeE<br>W = _0.0_0.005_0.995 | −10.2383 |
| R-1234yf_R-1225zc_R-1234zeE<br>W = _0.00125_0.00375_0.995 | −10.2426 |
| R-1234yf_R-1225zc_R-1234zeE<br>W = _0.0025_0.0025_0.995 | −10.2470 |
| R-1234yf_R-1225zc_R-1234zeE<br>W = _0.00375_0.00125_0.995 | −10.2513 |
| R-1234yf_R-1225zc_R-1234zeE<br>W = _0.005_0.0_0.995 | −10.2556 |
| R-515B | |

TABLE 4-continued

| Composition (mass ratio) | Heat of Combustion (kJ/gm) |
| --- | --- |
| R-1225zc_R-1234yf_R-1234zeE_R-227ea<br>W = _0.0_0.00456_0.90644_0.089 | −9.6321 |
| R-1225zc_R-1234yf_R-1234zeE_R-227ea<br>W = _0.00114_0.00342_0.90644_0.089 | −9.6281 |
| R-1225zc_R-1234yf_R-1234zeE_R-227ea<br>W = _0.00228_0.00228_0.90644_0.089 | −9.6241 |
| R-1225zc_R-1234yf_R-1234zeE_R-227ea<br>W = _0.00342_0.00114_0.90644_0.089 | −9.6202 |
| R-1225zc_R-1234yf_R-1234zeE_R-227ea<br>W = _0.00456_0.0_0.90644_0.089 | −9.6162 |
| R-450A | |
| R-1225zc_R-1234yf_R-1234zeE_R-134a<br>W = _0.0_0.0029_0.5771_0.42 | −8.6689 |
| R-1225zc_R-1234yf_R-1234zeE_R-134a<br>W = _0.00073_0.00218_0.5771_0.42 | −8.6664 |
| R-1225zc_R-1234yf_R-1234zeE_R-134a<br>W = _0.00145_0.00145_0.5771_0.42 | −8.6639 |
| R-1225zc_R-1234yf_R-1234zeE_R-134a<br>W = _0.00218_0.00073_0.5771_0.42 | −8.6614 |
| R-1225zc_R-1234yf_R-1234zeE_R-134a<br>W = _0.0029_0.0_0.5771_0.42 | −8.6588 |
| Refrigerant A (R-1234zeE_R-134a 0.63 0.37) | |
| R-1225zc_R-1234yf_R-1234zeE_R-134<br>W = _0.0_0.00315_0.62685_0.37 | −8.9919 |
| R-1225zc_R-1234yf_R-1234zeE_R-134<br>W = _0.00079_0.00236_0.62685_0.37 | −8.9891 |
| R-1225zc_R-1234yf_R-1234zeE_R-134<br>W = _0.00157_0.00157_0.62685_0.37 | −8.9864 |
| R-1225zc_R-1234yf_R-1234zeE_R-134<br>W = _0.00236_0.00079_0.62685_0.37 | −8.9837 |
| R-1225zc_R-1234yf_R-1234zeE_R-134<br>W = _0.00315_0.0_0.62685_0.37 | −8.9809 |

The results indicate that the inventive compositions with 1225zc all are less flammable than the corresponding control. Therefore, compositions comprising HFO-1234ze(E), HFO-1225zc and HFO-1234yf are preferred in use.

Example 5

Table 5 discloses the reaction products of the dehydrofluorination of 245fa over various catalysts in the presence of Z-HFC-1234ze (in mol %).

TABLE 5

| Catalyst | Others* | 143a | 152a | TFP | 1234yf | 1233xf |
| --- | --- | --- | --- | --- | --- | --- |
| JM 62-2 | 0.15% | 0.13% | 0.00% | 0.01% | 0.35% | 0.03% |
| LV | 0.28% | 0.14% | 0.03% | 0.02% | 0.04% | 0.00% |
| JM-62-3 | 0.28% | 0.14% | 0.02% | 0.02% | 0.24% | 0.04% |
| Newport-Chrome | 0.12% | 0.13% | 0.00% | 0.00% | 0.92% | 0.00% |

| Catalyst | E-1233zd | Z-1233zd | Z-1234ze | E-1234ze | E + Z-1234ze | |
| --- | --- | --- | --- | --- | --- | --- |
| JM 62-2 | 0.88% | 0.13% | 11.17% | 87.13% | 98.3% | |
| LV | 1.03% | 0.15% | 10.9% | 87.4% | 98.3% | |
| JM-62-3 | 0.92% | 0.14% | 11% | 87.2% | 98.2% | |
| Newport-Chrome | 0.92% | 0.11% | 10.5% | 87.3% | 97.8% | |

*comprises 236fa, 1225zc, 1225ye (E and/or Z), and 1234zc

An inconel tube (½ inch OD) was filled with 10 cc (8 gm) of catalyst (see Table 5). After charging the reactor tube, the temperature of the catalyst bed was raised to 300° C. and purged with nitrogen (30 cc/min) for 200 minutes. Then the flow of nitrogen was reduced to 60 cc/min and HF was fed at 20 cc/min for 60 minutes. The temperature was increase to 325° C. for 300 minutes. The flow of nitrogen was then lowered to 30 cc/min and the flow of HF was raised to 30 cc/min for 30 minutes. The flow of nitrogen was then lowered to 12 cc/min and the flow of HF was raised to 48 cc/min for 60 minutes. The flow of nitrogen was then discontinued, and the flow of HF was raised to 48 cc/min for 30 minutes. The reactor temperature was then decreased to 250° C. for 30 minutes. Afterwards HF was turned off and the reactor was purged with 30 cc/min of nitrogen. The reactor temperature was then stabilized at 300° C., the flow of nitrogen was turned off, and either $CF_3CH_2CHF_2$, or $CF_3CH_2CHF_2$ with 10.5-11% of Z-1234ze, was fed at 1.44 ml/hr. Contact time in the reactor was 45 seconds. The $CF_3CH_2CHF_2$ was vaporized at 50° C. Part of the reactor effluent was passed through a series of valves and analyzed by GCMS. Amounts for Z-1234ze, 134a, 152b, TFP, 1234yf, 1233xf, E-1233zd, Z-1233zd and E+Z-1234ze are expressed as mole percent. Results are summarized in Table 5. A grab sample was also taken for off-line GCMS analysis. It was surprisingly detected that the Others of Table 5 contained 236fa, 1225zc, 1225ye (E and Z), and 1234zc.

While any GCMS equipment, method and parameters, which are suitable for detecting the compounds that may be present in the inventive compositions, can be employed, one suitable method uses a single RTX-1 column.

Example 6

An inconel tube (½ inch {13 mm} OD) was filled with 5 cc (3.9 gm) of $Cr_2O_3$ catalyst (Louisville Cr) which was activated as described in Example 5. After activation, the flow of nitrogen was turned off, and the reactor temperature was set to 400° C. A flow of air (4 vol % O2) and either $CF_3CH_2CHF_2$ (245fa alone), or $CF_3CH_2CHF_2$ with 13.3 mole % (corresponding to 11.5 wt %) of Z-1234ze, was fed at 0.67 ml/hr. Contact time in the reactor was 38 seconds. The $CF_3CH_2CHF_2$ was vaporized at 50° C. Part of the reactor effluent was passed through a series of valves and analyzed by GCMS. After 72 hours the flow of oxygen was stopped, and the reactions were continued for another 72 hours in the absence of an oxygen containing gas. The catalysts started deactivating at a total time of about 120 hours for the reaction run with 245fa alone and at a total time of about 136 hours for the reaction run with 245fa containing Z-1234ze. Results are summarized in the following table with the amounts for Z-1234ze, 245fa and E-1234ze being expressed as mole percent:

TABLE 6

| | % Z-ze added | | | |
|---|---|---|---|---|
| | 0 | 0 | 13.3 | 13.3 |
| oxygen | yes | no | yes | no |
| Incoming composition | 100/0 | 100/0 | 86.7/13.3 | 86.7/13.3 |
| 245fa conversion (%) | 96.1 | 89.7 | 95.8 | 89.5 |
| Z-ze in product (%) | 22.9 | 21.1 | 22.7 | 20.8 |
| % recovered 245fa | 3.9 | 10.4 | 3.8 | 9.3 |

TABLE 6-continued

| | % Z-ze added | | | |
|---|---|---|---|---|
| | 0 | 0 | 13.3 | 13.3 |
| % E-ze | 73.2 | 68.6 | 73.5 | 69.9 |
| % yield E-ze | 73.2 | 60.2 | 85.0 | 80.9 |
| % selectivity E-ze | 76.2 | 76.4 | 88.7 | 90.2 |

Note that not all the activities described above in the general description or the examples are required, that a portion of a specific activity may not be required, and that one or more further activities may be performed in addition to those described. Still further, the order in which activities are listed are not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

While the invention has been described with reference to a preferred embodiment, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A heat transfer media comprising:
   (i) a fluoropropene component comprising at least 75 wt. % E-1,3,3,3-tetrafluoropropene (HFO-1234ze (E)) based on the total weight of the media, Z-1,3,3,3-tetrafluoropropene (HFO-1234ze (Z)), and
   (ii) at least one or more members selected from one of difluoromethane (R-32), 1,1-difluoroethane (HFC-152a), 1,1,2,2-tetrafluouroethane (HFC-134), 1,1,1,2-tetrafluouroethane (HFC-134a), 1,1,1,2,2-petfluoropropane (HFC-245cb), or 1-chloro-3,3,3-trifluoropropene (HCFO-1224yd),
   wherein the amount of Z-1,3,3,3-tetrafluoropropene (HFO-1234ze (Z)), if present, and the total amount of the at least one or more members (ii) is at most 25 wt. % based on the total weight of the media such that the total amount of the media is 100%.

2. The heat transfer media of claim 1, wherein one of the at least one or more members is selected from one of R-1224yd and R-134a.

3. The heat transfer media of claim 1, wherein the at least one or more members comprise R-1224yd and R-134.

4. The heat transfer media of claim 1, wherein the at least one or more members comprise R-1224yd and R-134a.

5. The heat transfer media of claim 1, wherein the at least one or more members comprise R-32 and R-152a.

6. The heat transfer media of claim 1 wherein each of the at least one or more members is present in an amount of at least 5 wt. % based on the total weight of the media such that the total amount of the media remains at 100%.

7. The heat transfer media of claim 1 wherein the amount of (i) E-1,3,3,3-tetrafluoropropene (HFO-1234ze (E)) based on the total weight of the media is between 75 wt. % and less than 90 wt. %, and the at least one or more members are present in an amount such that the total amount of the media remains at 100%.

8. The heat transfer media of any of claim 7, wherein the amount of E-1,3,3,3-tetrafluoropropene (HFO-1234ze (E)) based on the total weight of the media is greater than 80 wt. %.

9. The heat transfer media of claim 1, wherein the at least one or more members include HFC-245cb such that such that the total amount of the media remains at 100%.

10. The heat transfer media of claim 1 wherein R-134 a is present in an amount of greater than 1.0 wt. % based on the total weight of the heat transfer media provided such that the total amount of the media remains at 100%.

11. The heat transfer media of claim 1, further comprising a lubricant selected from the group consisting of mineral oils, such as paraffins, naphthenes and aromatics, alkylaryls, such as linear and branched alkyl alkylbenzenes, synthetic paraffins, synthetic naphthenes, poly (alphaolefins), polyol esters, polyalkylene glycols, and polyvinyl ethers.

12. A process for transferring heat, comprising providing an article; circulating and contacting the article with the heat transfer media of claim 1.

13. A refrigeration system, comprising: an evaporator; a condenser; a compressor; an expansion device; and a heat transfer medium, wherein the heat transfer medium comprises the heat transfer media of claim 1.

14. A method of producing cooling, the method comprising: evaporating the heat transfer media of claim 1 in the vicinity of a body to be cooled and thereafter condensing the fluoropropene composition.

15. A refrigeration apparatus, air-conditioning apparatus, or heat pump apparatus containing the heat transfer media of claim 3, wherein the refrigeration apparatus is a stationary or mobile refrigeration apparatus, and the air-conditioning apparatus is a mobile air-conditioning apparatus, preferably an automobile air-conditioning apparatus.

16. A process for transferring heat, comprising providing an article; and contacting the article with a heat transfer media composition which comprises the heat transfer media of claim 1.

17. A refrigeration system, comprising: an evaporator; a condenser; a compressor; an expansion device; and a heat transfer medium, and circulating the heat transfer medium of claim 1 through the system.

18. A method of producing cooling, the method comprising:
evaporating the heat transfer media of claim 1 in the vicinity of a body to be cooled and thereafter condensing the media.

19. A refrigeration apparatus, air-conditioning apparatus, or heat pump apparatus containing the media of claim 1, wherein the refrigeration apparatus is a stationary or mobile refrigeration apparatus, and the air-conditioning apparatus is a mobile air-conditioning apparatus, preferably an automobile air-conditioning apparatus.

20. A refrigeration apparatus comprising a chiller containing the media of claim 1.

21. The composition of claim 1 further comprising HFO-1234yf present in an amount between ≥0 and 0.001 wt. % such that the total amount of the media remains at 100%.

22. A process comprising: (1) providing a heat transfer system, said system including a contained supply of the heat transfer media of claims 1, and (2) circulating the media through the system.

23. The process of claim 22 wherein the heat system includes a compressor and the compressor provides a motive force to circulate the media.

* * * * *